(12) United States Patent
Bastyr et al.

(10) Patent No.: US 9,892,722 B1
(45) Date of Patent: Feb. 13, 2018

(54) METHOD TO ENSURE A RIGHT-LEFT BALANCED ACTIVE NOISE CANCELLATION HEADPHONE EXPERIENCE

(71) Applicant: MOTOROLA MOBILITY LLC, Chicago, IL (US)

(72) Inventors: Kevin Bastyr, Milwaukee, WI (US); Robert Zurek, Antioch, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/355,036

(22) Filed: Nov. 17, 2016

(51) Int. Cl.
| *A61F 11/06* | (2006.01) |
| *G10K 11/16* | (2006.01) |
| *G03B 29/00* | (2006.01) |
| *G10K 11/178* | (2006.01) |
| *G06F 3/16* | (2006.01) |

(52) U.S. Cl.
CPC .......... *G10K 11/1786* (2013.01); *G06F 3/165* (2013.01); *G10K 2210/1081* (2013.01); *G10K 2210/3014* (2013.01); *G10K 2210/3025* (2013.01)

(58) Field of Classification Search
CPC ............................. G10K 11/1786; G06F 3/165
See application file for complete search history.

(56) References Cited

U.S. PATENT DOCUMENTS

| 2006/0069556 A1* | 3/2006 | Nadjar | G10K 11/178 |
| | | | 704/229 |
| 2011/0293103 A1* | 12/2011 | Park | G10K 11/1782 |
| | | | 381/57 |
| 2015/0161981 A1* | 6/2015 | Kwatra | H04R 1/1083 |
| | | | 381/71.11 |

* cited by examiner

*Primary Examiner* — Simon King
(74) *Attorney, Agent, or Firm* — Yudell Isidore PLLC (57) ABSTRACT

A method and computer program product for dynamically balancing the active noise cancellation value at a first and second earphone interface of a headphone device. The method enables determination of a first active noise cancellation value of an anti-noise output signal at a first interface. The method determines a second active noise cancellation value of the anti-noise output signal at a second interface. A comparison is made between the first active noise cancellation value and the second active noise cancellation value. In response to the first active noise cancellation value and the second active noise cancellation value being outside of a predetermined margin of each other, at least one adjustable parameter associated with the anti-noise output signal is dynamically adjusted to balance active noise cancellation values at the first and second headphone nterface.

20 Claims, 5 Drawing Sheets

METHOD TO ENSURE A RIGHT-LEFT BALANCED ACTIVE NOISE CANCELLATION HEADPHONE EXPERIENCE

TECHNICAL FIELD

The present disclosure generally relates to electronic devices and in particular to a method for active noise cancellation in an electronic headphone device.

DESCRIPTION OF THE RELATED ART

The technology involved in the design of headphones and headset devices is continuously improving. In typical use, over-the-ear noise cancelling headphones fit identically on the right and left ears. In contrast, insert earphones are less likely to fit identically due to the nature of the earphone being inserted into the ear canal. Although current modifications to insert earphones enable the earphone to fit deep into the ear canal, an imbalanced fit is usually unavoidable. The imbalanced fit, or non-identical seal, results in a lack of bass frequencies being transmitted through the ear canal by the earphone (or earplug) that has the lesser seal. During headset use for listening to music, the imbalanced sound results in a less favorable experience for the user. When using noise-cancelling headphones, the imbalanced fit results in poor cancellation of ambient noise in the ear that lacks the seal. Typically, the asymmetry occurs above the frequency of two hertz, and more specifically, in the region of 20 to 500 hertz. Many users find that this low frequency ambient noise asymmetry is uncomfortable, and for some users the imbalance causes nausea.

BRIEF DESCRIPTION OF THE DRAWINGS

The description of the illustrative embodiments is to be read in conjunction with the accompanying drawings, wherein.

DETAILED DESCRIPTION

Disclosed are a method and a computer program product for a headphone device for dynamically balancing the active noise cancellation value at a first and second earphone interface of the headphones. The method includes detecting a first reference microphone signal and a first error microphone signal at a processor. The method enables determination of a first active noise cancellation value of an anti-noise output signal at a first interface. A second reference microphone signal and a second error microphone signal are detected. The method determines a second active noise cancellation value of the anti-noise output signal at a second interface. A comparison is made between the first active noise cancellation value and the second active noise cancellation value. In response to the first active noise cancellation value and the second active noise cancellation value being outside of a predetermined margin of each other, at least one adjustable parameter associated with the anti-noise output signal is dynamically adjusted to achieve balanced active noise cancellation values at the first and second headphone interface.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
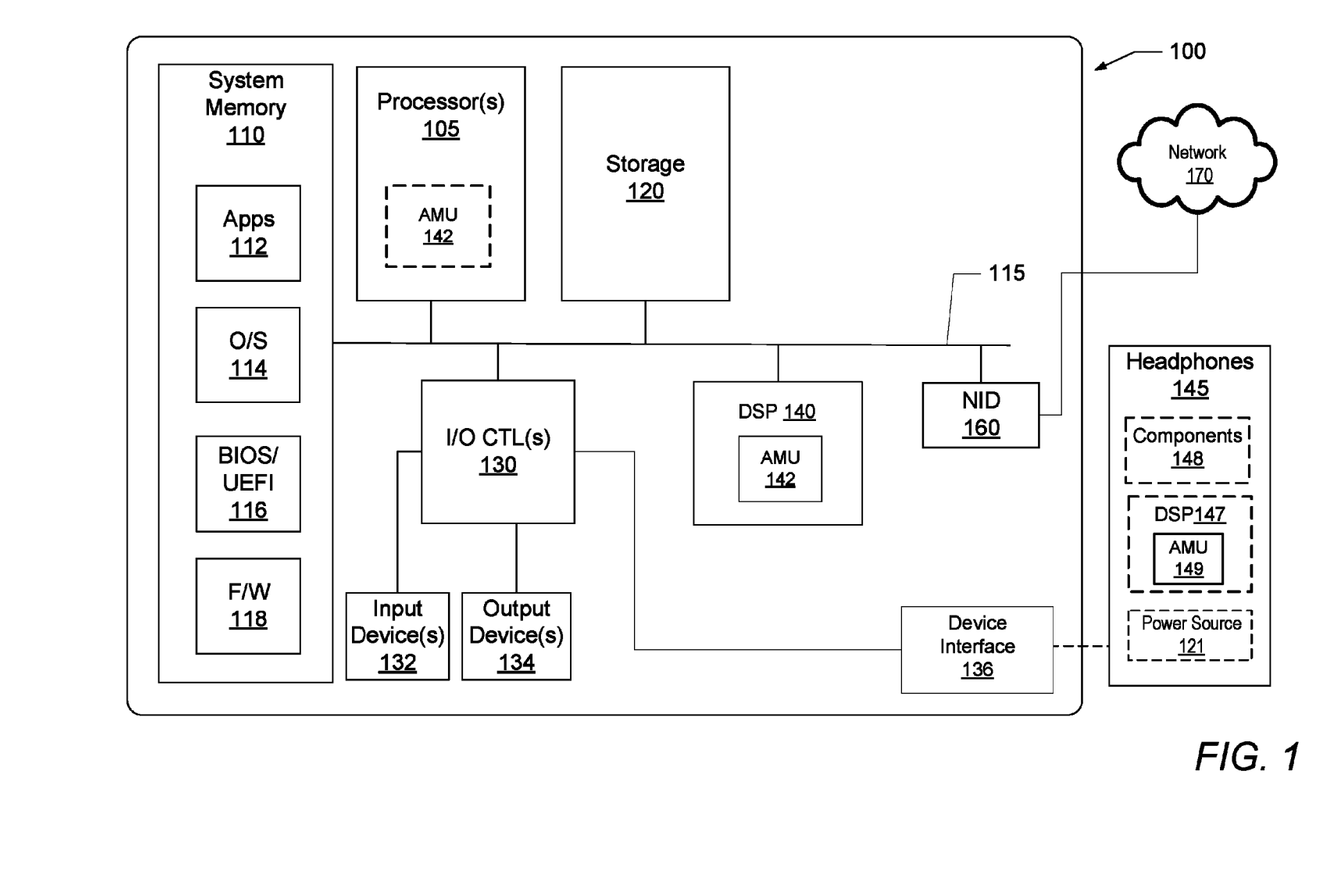
FIG. 1 provides a block diagram representation of an example data processing system within which certain aspects of the disclosure can be practiced, in accordance with one or more embodiments.

FIG. 1 illustrates a block diagram representation of an example data processing system (DPS) 100, within which one or more of the described features of the various embodiments of the disclosure can be implemented. For example, a data processing system may be a handheld device, personal computer, a server, a network storage device, or any other suitable device and may vary in size, shape, performance, functionality, and price. The data processing system may include random access memory (RAM), one or more processing resources such as a central processing unit (CPU) or hardware or software control logic, ROM, and/or other types of nonvolatile memory. Additional components of the data processing system may include one or more disk drives, one or more network ports for communicating with external devices as well as various input and output (I/O) devices, such as a keyboard, a mouse, and a video display. The data processing system may also include one or more buses operable to transmit communications between the various hardware components.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid-state drive. The one or more software and/or firmware modules within storage 120 can be loaded into system memory 110 during operation of DPS 100. As shown, system memory 110 can include therein a plurality of software and/or firmware modules including application(s) 112, operating system (O/S) 114, basic input/output system/unified extensible firmware interface (BIOS/UEFI) 116 and other firmware (F/W) 118. The various software and/or firmware modules have varying functionality when their corresponding program code is executed by processor(s) 105 or other processing devices within DPS 100. DPS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor, display device, and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. Device interface(s) 136 can be utilized to enable data to be read from or stored to a device such as headphone 145, or additional devices (not shown) for example a compact disk (CD), digital video disk (DVD), flash drive, or flash memory card. In one or more embodiments, device interfaces 136 can further include General Purpose I/O interfaces, such as an Inter-Integrated Circuit ($I^2C$) Bus, System Management Bus (SMBus), and peripheral component interconnect (PCI) buses.

DPS 100 further comprises a network interface device (NID) 160. NID 160 enables DPS 100 to communicate and/or interface with other devices, services, and components that are located external (remote) to DPS 100. These devices, services, and components can interface with DPS 100 via an external network, such as example network 170, using one or more communication protocols. In one embodiment, a customer-provisioned system/platform comprises multiple devices located across a distributed network, and NID 160 enables DPS 100 to be connected to these other devices. Network 170 can be a local area network, wide area network, personal area network, and the like, and the connection to and/or between network and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

DPS 100 includes digital signal processor (DSP) 140, which in turn includes and/or executes anti-noise management utility (AMU) 142. In an alternate embodiment, the functionality of DSP 140 is integrated within processors 105 and AMU 142 may optionally be located within processor 105 or within system memory 110 and executed by processor 105. AMU 142 executes within DPS 100 to perform the various methods and functions described herein. For simplicity, AMU 142 is illustrated and described as a stand-alone or separate software/firmware/logic component, which provides the specific functions and methods described herein. However, in at least one embodiment, AMU 142 may be a component of, may be combined with, or may be incorporated within firmware of DPS 100, or within the OS 114, and/or within one or more of applications 112. Additional aspects of AMU 142 and functionality thereof, are presented within the description of FIGS. 2-5.

In the present embodiment, headphones 145 are communicatively coupled to DPS 100 through device interface 136 by a wired connection (e.g., an auxiliary cable, or an alternate headphone communication cable). In one or more alternate embodiments, device interface 136 can support wireless connectivity, and headphones 145 communicatively couples to the wireless device interface (136) via, for example a Wireless Fidelity (Wi-Fi) network, Bluetooth® network (including Bluetooth® low energy (BLE) networks), a wireless ad hoc network (WANET), or personal area network (PAN). Headphones 145 include a processor, such as DSP 147, components 148, and power source 121.

In one embodiment, DSP 147, of headphones 145, include local AMU 149 stored on a non-volatile storage within headphones 145. In one or more embodiments, local AMU 149 executes on DPS 147 within headphones 145 to perform the various methods and functions described herein. Components 148 may include, for example, at least one microphone and at least one speaker. In some embodiments, components 148 provide the capability of feed forward feedback active noise cancelling (ANC) headphone systems, feedback only ANC systems, fixed-filter only feed forward systems, adaptive scalar-gain (fixed infinite impulse response shape, adaptive gain) feed forward systems, and fully finite impulse response adaptive least-mean-square feed forward ANC systems. Although example processor DSP 147 is illustrated, in at least one embodiment an analog processor may be utilized to execute the methods presented herein.

Figure 2:
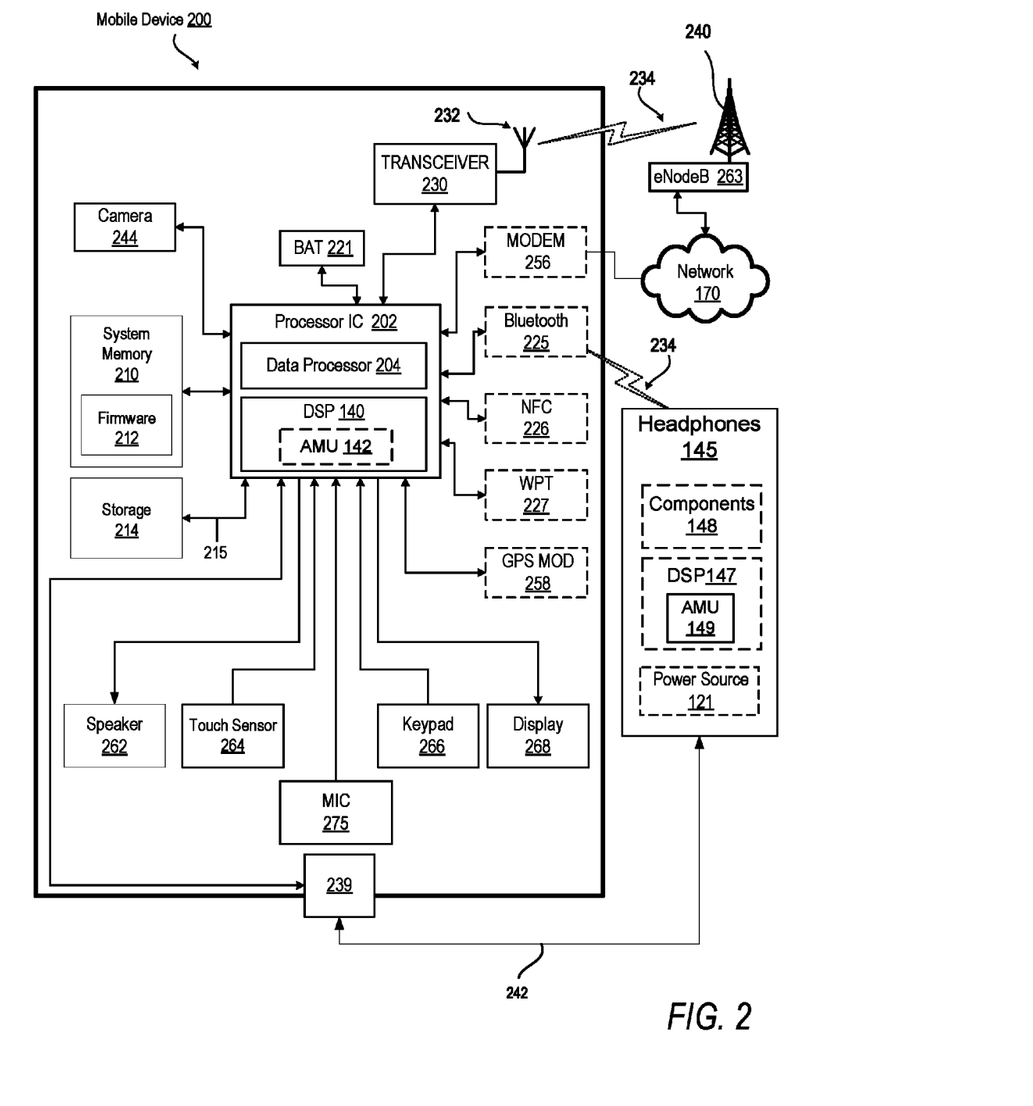
FIG. 2 illustrates a mobile device within which certain aspects of the disclosure can be practiced, in accordance with one or more embodiments.

With reference now to FIG. 2, there is illustrated mobile device 200 which includes at least one processor or processor integrated circuit 202. Included within processor IC 202 are data processor 204 and DSP 140. Within DSP 140 is AMU 142. Processor IC 202 is coupled to system memory 210 and non-volatile storage 214 via a system communication mechanism, such as system interconnect 215. System interconnect 215 can be interchangeably referred to as a system bus, in one or more embodiments. System interconnect 215 is utilized to connect at least one component to processor IC 202. One or more software and/or firmware modules can be loaded into system memory 210 during operation of mobile device 200. Specifically, in one embodiment, system memory 210 can include therein a plurality of such modules, including firmware (F/W) 212. System memory 210 may also include basic input/output system and an operating system (not shown). The software and/or firmware modules provide varying functionality when their corresponding program code is executed by data processor 204 or by secondary processing devices within mobile device 200.

Processor IC 202 supports connection by and processing of signals from one or more connected input devices such as touch sensor 264, microphone 275, keypad 266, and display 268 (when display 268 is a touch screen device). Processor IC 202 also supports one or more connected output devices, for example, display 268 (when display 268 is a non-touch screen device) and speaker 262. Additionally, in one or more embodiments, one or more device interfaces 239, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 221 that supplies power to mobile device 200.

Mobile device 200 further includes Bluetooth transceiver 225 and global positioning system module (GPS MOD) 258, all of which are in communication with processor IC 202. Modem 256, Bluetooth transceiver 225, and GPS MOD 258 enable mobile device 200 and/or components within mobile device 200 to communicate and/or interface with other devices, services, and components that are located external to mobile device 200. As a wireless device, mobile device 200 can transmit data over wireless network 170. Mobile device 200 connects to one or more external devices, such as headphones 145 via at least one of wireless signal 234 and headphones communication cable 242.

Mobile device 200 is presented as a wireless communication device, and mobile device 200 includes transceiver 230, which is communicatively coupled to processor IC 202 and to antenna 232. Transceiver 230 allows for wide-area or local wireless communication between mobile device 200 and evolved node B (eNodeB) 262 via wireless signal 234 in communication with antenna 240. Mobile device 200 is capable of wide-area or local wireless communication with other mobile wireless devices or with eNodeB 262 as a part of a wireless communication network. Mobile device 200 communicates with other mobile wireless devices by utilizing a communication path involving transceiver 230, antenna 232, wireless signal 234, antenna 240, and eNodeB 262. As provided by FIG. 2, mobile device 200 additionally includes near field communication transceiver (NFC TRANS) 226, and wireless power transfer (WPT) receiver 227. Transceiver 230 is communicatively coupled to antenna 232. In one embodiment antenna 232 is an integrated dual-band antenna, and antenna 232 enables near field and far field communication for GPS, and Bluetooth via transceiver 225.

Mobile device 200 includes communication and connection mechanisms to enable communication with external, peripheral devices, including headphones 145. Similar to FIG. 1, headphones 145 include a processor, such as digital signal processor (DSP) 147, components 148, and power source 121. DSP 147, of headphones 145, executes local AMU 149. Components 148 may include at least one microphone and at least one speaker, for example. AMU 142 executes within mobile device 200. For simplicity, AMU 142 and local AMU 149 are illustrated and described as a stand-alone or separate software/firmware/logic component, which provides the specific functions and methods described herein.

Figure 3:
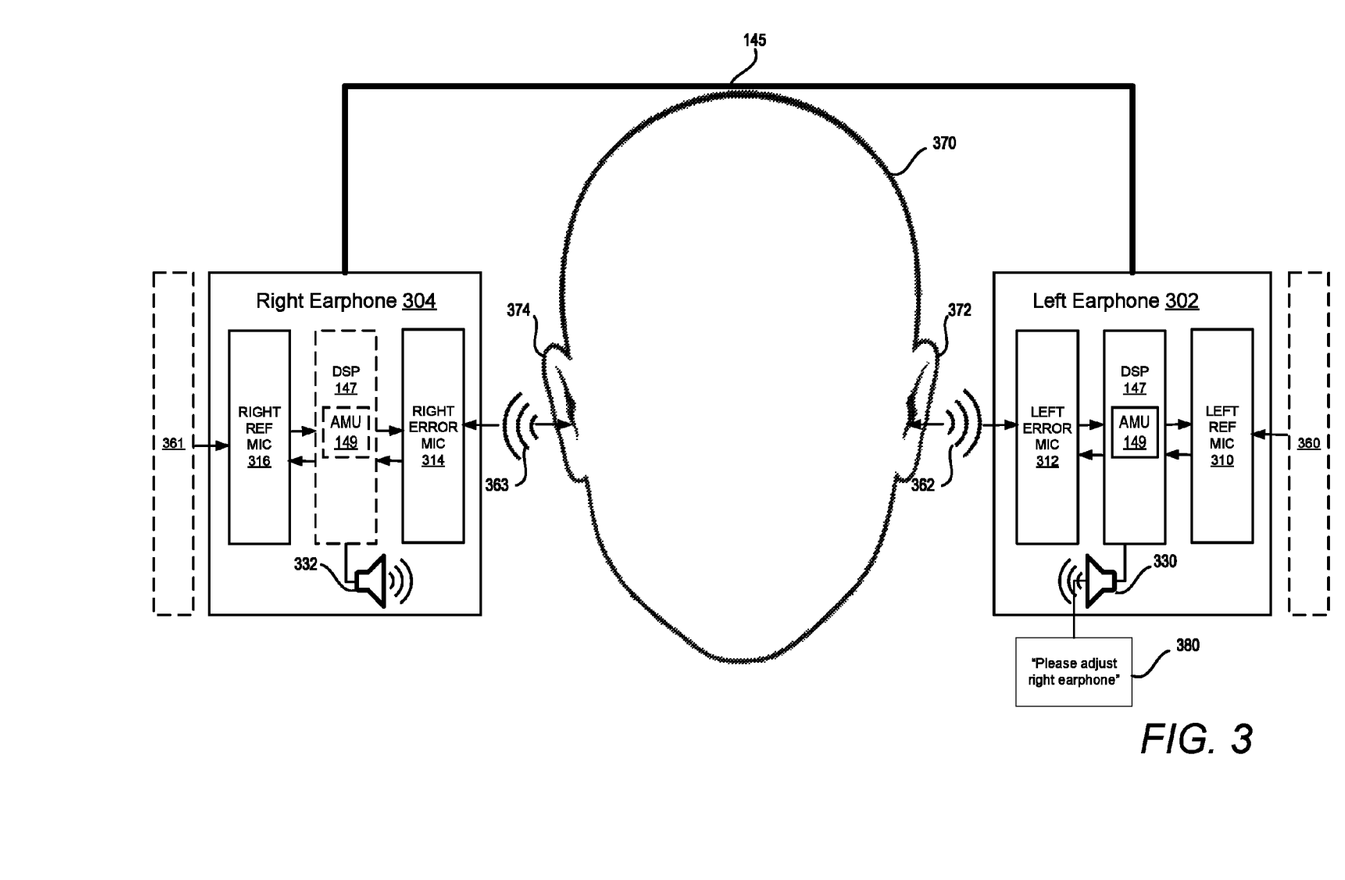
FIG. 3 illustrates an example headphone device used for adjusting anti-noise output signals, according to one or more embodiments.

FIG. 3 is a block diagram illustrating an example headphone device used for adjusting anti-noise signals. Headphones 145 include left earphone 302 and right earphone 304. In FIG. 3, headphones 145 are shown having left earphone 302 and right earphone 304 positioned around the head of user 370. User 370 has left ear 372 and right ear 374. Within right earphone 304 are components such as right error microphone 314, right reference microphone 316, and right output speaker 332. Ambient noise and residual noise are detected by right reference microphone 316 and right error microphone 314, respectively. Ambient noise is illustrated as ambient noise 360 and 361. Residual noise is illustrated as right interface noise 363 and left interface noise 362. Ambient noise includes the surrounding noise that is not blocked by the seal of left earphone 302 and right earphone 304. Residual noise, or left interface noise 362 and right interface noise 363, is the sum of the anti-noise signals (e.g. signals output from speaker 332) and ambient noise 360 and 361 at left ear 372 and right ear 374, respectively.

Within left earphone 302 are components such as left reference microphone 310, left error microphone 312, and left output speaker 330. Ambient noise is detected by left reference microphone 310. Left error microphone 312, detects left interface noise 362. Also illustrated within left earphone 302 is a processor, such as DSP 147. Illustrated within DSP 147 is local AMU 149. Although illustrated as a functional component or utility within both earphones, local AMU 149 can be provided in only one earphone, or not located in the headphones 145 at all. For example, as shown in FIG. 1 and FIG. 2, local AMU 149 may be an application that is associated with and executed by a processing device of a connected audio producing output device, such as DPS 100 or mobile device 200. According to one or more embodiments, AMU 142 and local AMU 149 are provided within and/or associated with at least one of DPS 100, mobile device 200, or headphones 145. Left earphone 302 is positioned inside left ear 372, and right earphone 304 positioned inside right ear 374 for ear insert earphones, or earbud type headphones. Left earphone 302 is positioned over left ear 372, and right earphone 304 is positioned over right ear 374 for over-the-head type headphones.

Left error microphone 312 is coupled to a first speaker, left output speaker 330. Left reference microphone 310 is isolated from left output speaker 330. Right error microphone 314 is coupled to right output speaker 332. Right reference microphone 316 is isolated from right output speaker 332. An audio producing output device, for example, DPS 100 and mobile device 200, is communicatively coupled to DSP 147. DSP 147 is coupled to left error microphone 312, left reference microphone 310, and left output speaker 330. Additionally, DPS 100 and mobile device 200 are coupled to right error microphone 314, right reference microphone 316, and right output speaker 332, via DSP 147.

During audio signal processing, right earphone 304 utilizes local AMU 149, within DSP 147. Right reference microphone 316 receives ambient noise signal 361. Right interface noise 363, also described as interference noise, is a feedback signal received at right error microphone 314, and the right ear or right ear canal of user 370. Right output speaker 332 transmits audible signals to a listener.

Left reference microphone 310 receives ambient noise signal 360. A feedback signal, left interface noise 362 also described as interference noise, is received at left error microphone 312, and the left ear or left ear canal of a user. Left output speaker 330 is utilized to transmit audible signals to a listener. The area between left ear 372 or right ear 374 of user 370 and left earphone 302 or right earphone 304, respectively, is considered an interface.

In one embodiment, DSP 147 computes the frequency dependent spectra of the signals associated with the microphones within headphones 145. In this example, left reference microphone 310 and right reference microphone 316 operate as feed forward microphones and receive ambient noise signal 361. Left error microphone 312 and right error microphone 314 respectively receive interface noise 362 and interface noise 363, which may include feedback noise from the ear canal of a listener. The frequency dependent spectra of the signals are computed by DSP 147 execution of local AMU 149 for each microphone. The frequency dependent spectra at left reference microphone 310 is subtracted from the frequency dependent spectra at left error microphone 312 to determine an estimate of the active noise cancellation value at the left ear of the listener. Similarly, the frequency dependent spectra at right reference microphone 316 is subtracted from the frequency dependent spectra at right error microphone 314 to determine an estimate of the active noise cancellation value at the right ear of the listener.

The values of the difference of the frequency dependent spectra of left earphone 302 and the difference of the frequency dependent spectra of right earphone 304 are compared. In response to the difference being relatively large, for example, greater than four decibel (dB), in any of the ⅓ octave bands within the low frequency region, a signal parameter is dynamically adjusted. The signal parameter may be selected by user 370, or dynamically selected by AMU 149. The selected signal parameter is dynamically adjusted to a predetermined range and/or a predefined frequency range selected to be acceptable by a specific user. For example, the selected signal parameter can be the volume, bass frequency level, treble frequency level, and/or gain. In embodiments where the selected parameter is the gain, at least one of left earphone 302 and right earphone 304 are adjusted to achieve an ideal gain. Relative to the current circumstances and environment, DSP 147 determines which of the two gains (at left earphone 302 and right earphone 304) is the ideal gain and which of the two gains is the least preferred gain. DSP 147 creates a balance for the user by decreasing the ideal gain until the estimated level of active noise cancellation is approximately equal in left earphone 302 and right earphone 304.

In one embodiment, at least one of left earphone 302 and right earphone 304 does not have a snug or comfortable fit over the corresponding ear, or does not fit tightly into the opening of the corresponding ear canal. For example, the earphone may have moved out of place or the fit (i) in the ear (for earbud headphones) or (ii) over the ear (for over the ear headphones) is not identical on each side. In this example DSP 147 dynamically provides a balance of noise cancellation. To produce the balance of noise cancellation, DSP 147 dynamically adjusts the scalar gain of a fixed frequency shape infinite impulse response (IIR) filter to de-tune the noise cancellation at the interface of the earphone with the better fit. Detuning the audio output at the earphone with the better fit, or seal between ear and earphone, produces a more balanced overall active noise cancellation experience. In this example, DSP 147 determines an active noise cancellation value at left earphone 302 and right earphone 304, then compares the left active noise cancellation value and the right active noise cancellation value. In response to the active noise cancellation value at left earphone 302 and the active noise cancellation value at right earphone 304 being outside of a predetermined margin of each other, DSP 147 dynamically adjusts at least one adjustable parameter, such as the scalar gain, associated with an anti-noise output. More specifically, the anti-noise output signal is detuned by a dynamically determined amount at the interface associated with the lower active noise cancellation value. The detuning of the anti-noise output signal continues until the left active noise cancellation value is substantially similar to the right active noise cancellation value.

In another embodiment, distinctive audible sound 380 is generated when a seal between the ear of a user and at least one of the two earphones is not identical. Distinctive audible sound 380 is noise or an audible message that warns the user to adjust at least one earphone to improve the active noise cancellation balance among the earphones. DSP 147 detects the frequency dependent spectra of left reference microphone 310 and left error microphone 312. In response to detection of the frequency dependent spectra, the active noise cancellation value of the anti-noise output signal for left earphone 302, is determined as a first active noise cancellation value. A second frequency dependent spectra for right reference microphone 316 and right error microphone 314 is also detected. In response to detection of the second frequency dependent spectra, DSP 147 determines a second active noise cancellation value of the anti-noise output signal for right earphone 304. Further, left error microphone 312 and left output speaker 330 are associated with an anti-noise signal at a first interface, which for example is the interface between left earphone 302 and left ear 372 of a user. Right error microphone 314 and right output speaker 332 are associated with the anti-noise signal at a second interface, which is or can be the interface between right earphone 304 and right ear 374 of a user. In response to the first active noise cancellation value and the second active noise cancellation value not being within a predetermined margin of each other, DSP 147 generates distinctive audible sound 380 which provides notification of an inequality between the first active noise cancellation value and the second active noise cancellation value. Audible sound 380 is generated to at least one of left ear 302 and right ear 304.

In an alternate embodiment, a processor, for example an analog processor, monitors a first set of signals at left reference microphone 310 and left error microphone 312. An estimate for a first active noise cancellation value is produced when the processor executes bandpass filtering on each of the signals, and then computes their difference. The processor monitors a second set of signals at right reference microphone 316 and right error microphone 314. An estimate for a second active noise cancellation value is produced when the processor executes bandpass filtering on each of these signals, and then computes their difference. A comparator associated with the processor compares the estimate of the first active noise cancellation value and the estimate of the second active noise cancellation value. The processor dynamically adjusts the first active noise cancellation value and the second active noise cancellation value until the values are substantially equal.

In still another embodiment, DSP 147 continuously monitors at least one signal to determine when a change occurs in the received signals. For example, DSP 147 monitors an anti-noise signal at left error microphone 312 and the anti-noise signal at right error microphone 314, respectively. Left error microphone 312 is associated with a first interface and right error microphone 314 is associated with a second interface. DSP 147 determines when an active noise cancellation value is less at one of the first interface and the second interface. In another example, DSP 147 monitors an input signal at left reference microphone 310 and an input signal at right reference microphone 314 to determine a signal gain that is associated with left reference microphone 312 and right reference microphone 314. Then, DSP 147 decreases the signal gain at an interface associated with the active noise cancellation value that is less, until the left active noise cancellation value and the right active noise cancellation value are substantially equivalent.

Figure 4:
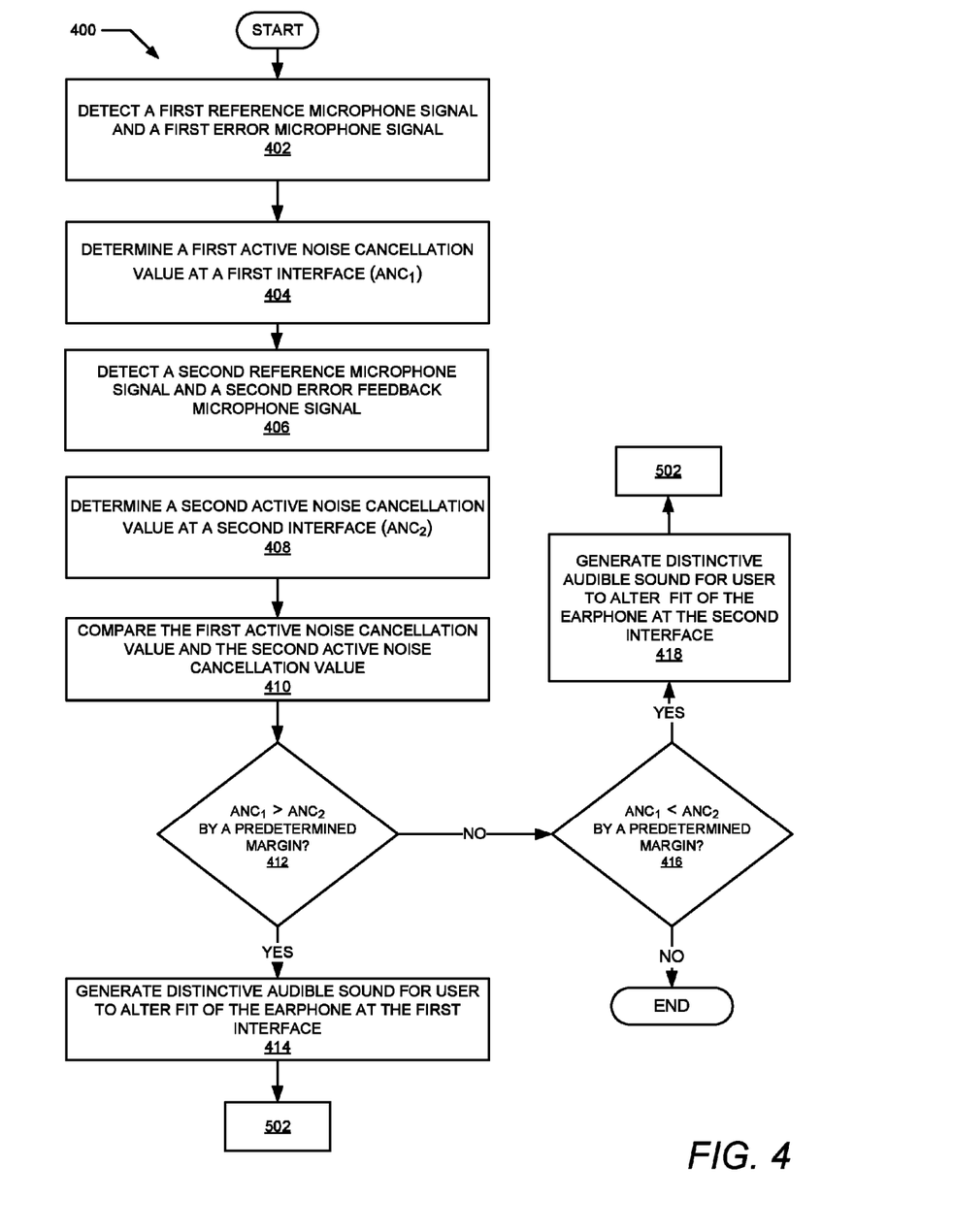
FIG. 4 is a flow chart illustrating a method for detecting a balance of active noise cancellation in a headphone device, in accordance with one or more embodiments.
Figure 5:
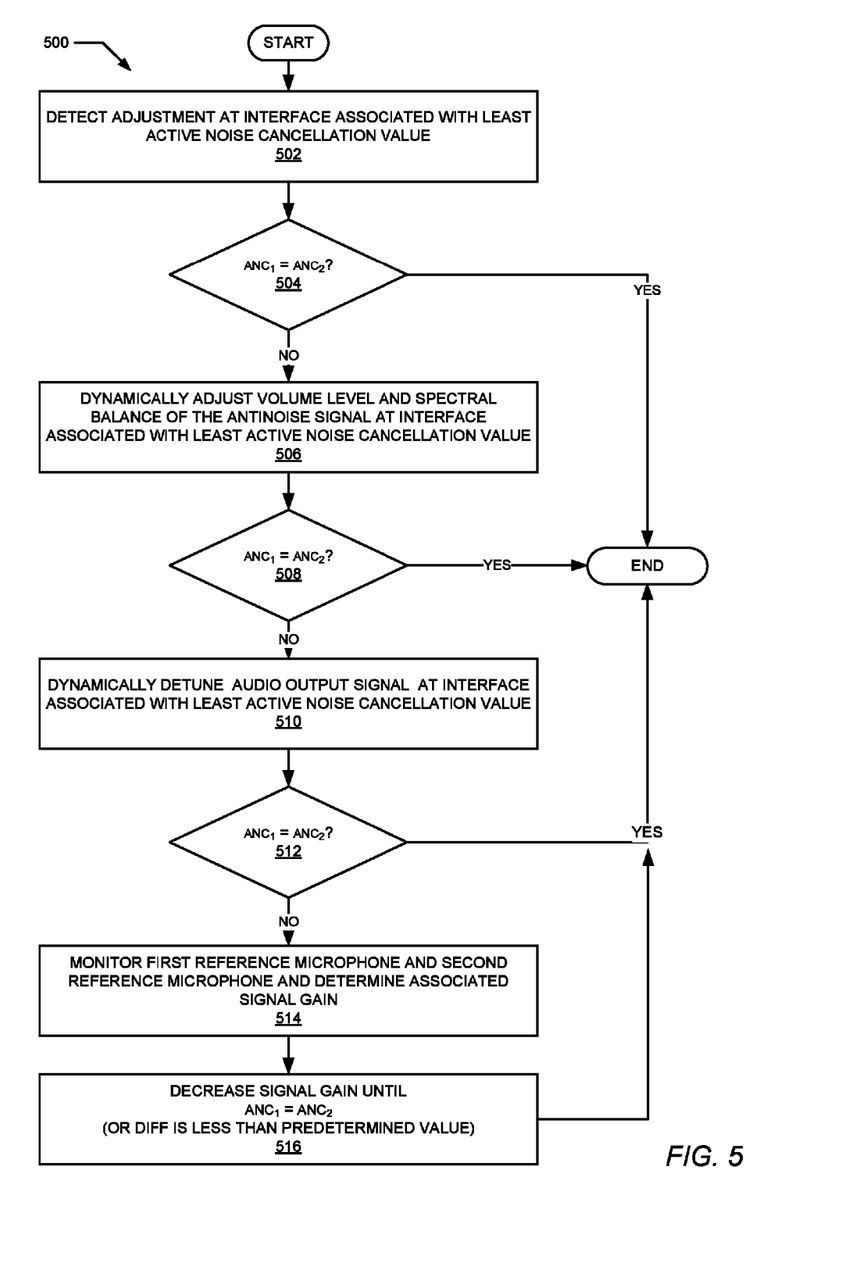
FIG. 5 is a flow chart illustrating a method for dynamically balancing the active noise cancellation value at a first and a second headphone interface, in accordance with one or more embodiments.

Referring now to FIG. 4 and FIG. 5. FIG. 4 provides a method for detecting whether anti-noise is balanced in a headphones device, in accordance with one or more embodiments of the present disclosure. FIG. 5 describes the method for dynamically adjusting parameters associated with anti-noise, in accordance with one or more embodiments of the present disclosure. Aspects of the methods are described with reference to the components of FIGS. 1-3. Several of the processes of the method provided in FIG. 4 and FIG. 5 can be implemented by a processor (e.g., DSP 140 or DSP 147) executing software code of respective AMU 142 and local AMU 149 within a generic data processing system 100 (FIG. 1), mobile device 200 (FIG. 2), or headphones 145. In the following method processes described in FIG. 4 and FIG. 5, DSP 140 executes AMU 142 or DSP 147 executes local AMU 149 to perform the steps described herein.

Method 400 commences at the start block, then proceeds to block 402. At block 402, a first reference microphone signal (361) and a first error microphone signal (363) are detected. A first active noise cancellation value ($ANC_1$) is determined at block 404. At block 406, a second reference microphone signal (360) and a second error feedback microphone signal (362) are detected. In response to the detection, at block 408, a second active noise cancellation value ($ANC_2$) at a second interface is determined. At block 410, $ANC_1$ is compared to $ANC_2$. A determination is made, at block 412, whether the value of $ANC_1$ is greater than the value of $ANC_2$ by at least a predetermined margin. If the value of $ANC_1$ is greater than the value of $ANC_2$ by at least the predetermined margin, the method continues to block 414. At block 414, the DSP generates distinctive audible sound 380 as a notification for the user to alter the fit of the earphone at the first interface (or at the earphone that does not have a secure fit over the ear or within the ear canal). Then the process continues to block 502. If the value of $ANC_1$ is not greater than the value of $ANC_2$ by at least the predetermined margin, the process continues to block 416. A determination is made, at block 416, whether $ANC_2$ is greater than $ANC_1$ by at least a predetermined margin. If $ANC_2$ is greater than $ANC_1$ by at least the predetermined margin, distinctive audible sound 380 is generated for the user to alter/adjust the fit of the earphone at the second interface (or at the earphone that does not have a secure fit over the ear or within the ear canal), at block 418. If $ANC_2$ is not greater than $ANC_1$ by the predetermined margin, the process concludes at the end block.

Method 500 commences at the start block, then proceeds to block 502. At block 502 an adjustment at the interface associated with the lower active noise cancellation value is detected. A determination is made, at block 504, whether the value of $ANC_1$ is substantially equal to the value of $ANC_2$. If the value of $ANC_1$ is substantially equal to the value of $ANC_2$ the process ends. If the value of $ANC_1$ is not equal to the value of $ANC_2$, the process continues to block 506. At block 506, the volume level and spectral balance of the anti-noise signal is dynamically adjusted for the interface associated with the lower active noise cancellation value. At block 508, a next determination is made whether the value of $ANC_1$ is substantially equal to the value of $ANC_2$. If the value of $ANC_1$ is substantially equal to the value of $ANC_2$ the process ends. However, if the value of $ANC_1$ is not equal to the value of $ANC_2$, the process continues to block 510 where DSP 147 detunes the audio output signal at the interface associated with the lower active noise cancellation value, enabling the better tuned earphone to become less tuned, or enables the better tuned earphone to output a sound that is slightly out of tune, to balance the frequency of the sound output by left earphone 302 and right earphone 304. At block 512, a determination is made whether the value of $ANC_1$ is approximately equal to the value of $ANC_2$. If the value of $ANC_1$ is approximately equal to the value of $ANC_2$ the process ends. If the value of $ANC_1$ is not approximately equal to the value of $ANC_2$ the process continues to block 514. At block 514, the first reference microphone (316) and second reference microphone (310) are monitored to determine an associated signal gain. DSP 147 decreases the signal gain, at block 516, for the first earphone (304) and second earphone (302) until $ANC_1$ is equal to $ANC_2$, or until the difference is less than a predetermined value. The process concludes at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   determining a first active noise cancellation value of a first anti-noise output signal at a first interface associated with a first reference microphone signal and a first error microphone signal;
   determining a second active noise cancellation value of a second anti-noise output signal at a second interface associated with a second reference microphone signal and a second error microphone signal;
   comparing, by a processor, the first active noise cancellation value to the second active noise cancellation value; and
   in response to the first active noise cancellation value and the second active noise cancellation value being outside of a predetermined margin of each other, generating a distinctive audible sound that provides notification of an inequality between the first active noise cancellation value and the second active noise cancellation value.

2. The method of claim 1, further comprising:
   dynamically monitoring the anti-noise output signal at the first interface and the second interface; and
   determining when an active noise cancellation value is less at one of the first interface and the second interface; and
   in response to the active noise cancellation value being less at one of the first interface and the second interface, dynamically adjusting at least one adjustable parameter associated with at least one of the first and the second anti-noise output signal.

3. The method of claim 2, wherein dynamically adjusting the at least one adjustable parameter comprises:
   dynamically modifying at least one of a volume level and spectral characteristic of the anti-noise output signal at one of the first interface and the second interface when a difference of the first active noise cancellation value and the second active noise cancellation value is greater than a predetermined margin.

4. The method of claim 3, further comprising:
   altering at least one of the volume level and spectral balance of the anti-noise output signal.

5. The method of claim 1, further comprising:
   dynamically selecting an adjustable parameter associated with anti-noise signal detune; and adjusting the selected adjustable parameter by a determinable amount at an interface associated with a corresponding one of the first active noise cancellation value and the second active noise cancellation value to detune the anti-noise output signal until the first active noise cancellation value is substantially similar to the second active noise cancellation value.

6. The method of claim 1, further comprising:
monitoring a first anti-noise signal at a first reference microphone and a second anti-noise signal at a second reference microphone;
determining an anti-noise signal gain associated with at least one of the first reference microphone and the second reference microphone; and
adjusting a signal gain until the first active noise cancellation value is substantially similar to the second active noise cancellation value.

7. The method of claim 1, wherein:
the first interface is associated with a first ear of a user, and the second interface is associated with a second ear of a user; and
the generating a distinct audible sound comprises outputting at least one of a graphical user interface and an audible speech output providing instruction to adjust one of the first interface and the second interface.

8. The method of claim 1, wherein:
the processor is a digital signal processor; and
the digital signal processor is located within one of a data processing system, mobile device, and a headphone device.

9. The method of claim 1, wherein:
both the first active noise cancellation value and the second active noise cancellation value are frequency dependent spectrums.

10. A system comprising:
a processor;
a first error microphone and a first reference microphone respectively coupled to a first output speaker;
a second error microphone and a second reference microphone respectively coupled to a second output speaker; and
an audio output device communicatively coupled to the processor, the first error microphone, first reference microphone, first output speaker, second error microphone, second reference microphone, and second output speaker, and which includes a utility comprising a plurality of algorithms that configure the processor to:
compare a first active noise cancellation value to a second active noise cancellation value; and
in response to the first active noise cancellation value and the second active noise cancellation value not being within a predetermined margin of each other, generates a distinctive audible sound that provides notification of an inequality between the first active noise cancellation value and the second active noise cancellation value.

11. The system of claim 10, wherein:
the processor detects a first frequency dependent spectra of a first reference microphone and a first error microphone;
in response to detection of the first frequency dependent spectra, the first active noise cancellation value of the anti-noise output signal is determined;
the processor detects a second frequency dependent spectra of a second reference microphone and a second error microphone; and in response to detection of the second frequency dependent spectra, the second active noise cancellation value of the anti-noise output signal is determined.

12. The system of claim 10, wherein:
the first error microphone and the first output speaker are associated with an anti-noise signal at a first interface; and
the second error microphone and the second output speaker are associated with the anti-noise signal at a second interface.

13. The system of claim 10, wherein in generating the distinct audible sound the processor outputs at least one of a graphical user interface and an audible speech output that provides instruction to adjust one of the first interface and the second interface.

14. The system of claim 10, wherein the processor adjusts a parameter associated with the anti-noise output signal when a difference of the first active noise cancellation value and the second active noise cancellation value is greater than a predetermined active noise cancellation margin.

15. The system of claim 10, wherein the processor detunes the anti-noise output signal a dynamically determined amount at an interface associated with an active noise cancellation value that is less until the first active noise cancellation value is substantially similar to the second active noise cancellation value.

16. The system of claim 10, wherein the processor monitors an anti-noise signal at the first error microphone and the anti-noise signal at the second error microphone, respectively associated with a first interface and a second interface, to determine when an active noise cancellation value is less at one of the first interface and the second interface.

17. The system of claim 16, the processor monitors an input signal at the first reference microphone and an input signal at the second reference microphone to determine a signal gain that is associated with the first reference microphone and the second reference microphone, and the signal gain at an interface respectively associated with the lower active noise cancellation value, is decreased until the first active noise cancellation value and the second active noise cancellation value are substantially equivalent.

18. A computer program product comprising:
a computer readable storage device; and
program code on the computer readable storage device that when executed within a digital signal processor associated with an audio output system, the program code enables the digital signal processor to provide functionality of:
determining a first active noise cancellation value of a first anti-noise output signal at a first interface associated with a first reference microphone signal and a first error microphone signal;
determining a second active noise cancellation value of a second anti-noise output signal at a second interface associated with a second reference microphone signal and a second error microphone signal;
comparing the first active noise cancellation value to the second active noise cancellation value; and
in response to the first active noise cancellation value and the second active noise cancellation value being outside of a predetermined margin of each other, generating a distinctive audible sound that provides notification of an inequality between the first active noise cancellation value and the second active noise cancellation value.

19. The computer program product of claim 18, the program code further comprising program code that enables the digital signal processor to provide the functionality of:

dynamically monitoring the anti-noise output signal at the first interface and the second interface;
determining when an active noise cancellation value is less at one of the first interface and the second interface;
in generating the distinctive audible sound, displaying at least one of a graphical user interface and audible speech output providing instruction to adjust one of the first interface and the second interface;
dynamically modifying at least one of a volume level and spectral characteristic of the anti-noise output signal at one of the first interface and the second interface when a difference of the first active noise cancellation value and the second active noise cancellation value is greater than the predetermined margin; and
altering at least one of the volume level and spectral balance of the anti-noise output signal.

20. The computer program product of claim 18, the program code further comprising program code that enables the digital signal processor to provide the functionality of:
dynamically selecting an adjustable parameter associated with anti-noise signal detune;
adjusting the adjustable parameter by a determinable amount at an interface associated with the first active noise cancellation value and the second active noise cancellation value to detune the anti-noise output signal until the first active noise cancellation value is substantially similar to the second active noise cancellation value;
monitoring a first anti-noise signal at a first reference microphone and a second anti-noise signal at a second reference microphone;
determining an anti-noise signal gain associated with the first reference microphone and the second reference microphone, in response to the monitoring; and
adjusting a signal gain until the first active noise cancellation value is substantially similar to the second active noise cancellation value, wherein the first active noise cancellation value is a frequency dependent spectrum, and the second active noise cancellation value is a frequency dependent spectrum.

* * * * *